(12) United States Patent
Ayoub et al.

(10) Patent No.: US 10,575,674 B2
(45) Date of Patent: Mar. 3, 2020

(54) FOOD OR BEVERAGE PREPARATION MACHINE

(71) Applicant: NESTEC S.A., Vevey (CH)

(72) Inventors: Michael Ayoub, Crissier (CH); Xavier Greppin, Ecublens (CH); Antoine Gardiol, Chavornay (CH); Nicolas Stoudmann, Cugy (CH); Pierre-Yves Vannay, La Tour de Peilz (CH)

(73) Assignee: Societe des Produits Nestle S.A., Vevey (CH)

( * ) Notice: Subject to any disclaimer, the term of this patent is extended or adjusted under 35 U.S.C. 154(b) by 336 days.

(21) Appl. No.: 15/320,416

(22) PCT Filed: Jun. 23, 2015

(86) PCT No.: PCT/EP2015/064110
§ 371 (c)(1),
(2) Date: Dec. 20, 2016

(87) PCT Pub. No.: WO2015/197615
PCT Pub. Date: Dec. 30, 2015

(65) Prior Publication Data
US 2018/0206669 A1    Jul. 26, 2018

(30) Foreign Application Priority Data

Jun. 25, 2014   (EP) .................................. 14173920

(51) Int. Cl.
*A47J 31/36* (2006.01)
*A47J 31/44* (2006.01)
*A47J 31/52* (2006.01)

(52) U.S. Cl.
CPC ....... *A47J 31/4403* (2013.01); *A47J 31/3685* (2013.01); *A47J 31/52* (2013.01); *C08L 2201/12* (2013.01)

(58) Field of Classification Search
CPC ................ A47J 31/3685; A47J 31/4496; A47J 31/4403; A47J 31/3638; A47J 31/3633;
(Continued)

(56) References Cited

U.S. PATENT DOCUMENTS 3,826,879 A * 7/1974 Penn ......................... A47L 9/26
191/12.2 R
6,224,755 B1 * 5/2001 Schamberg ........... A47J 31/002
210/149

(Continued)

FOREIGN PATENT DOCUMENTS

CN    102325483 A    1/2012
CN    103813740 A    5/2014
(Continued)

OTHER PUBLICATIONS

Chinese Office Action for corresponding Chinese Application No. 201580034550.8, dated Nov. 28, 2018; (14 pages).

*Primary Examiner* — Tu B Hoang
*Assistant Examiner* — Tiffany T Tran
(74) *Attorney, Agent, or Firm* — K&L Gates LLP

(57) ABSTRACT

The present invention is directed to a home food or beverage preparation machine (1) comprising a mechanical part which is mobile between at least a first and a second position. The machine (1) comprises an actuator comprising a wire (13) made of a shape memory material. This wire (13) has a retracted state and an extended state, and the actuator is configured to move the mechanical part to or maintain the mechanical part in one of said first and second positions by retraction of the wire. Any mobile part of a home food or beverage preparation machine, and more particularly a valve assembly or a mobile plate (22) for clamping an ingredient package may thus be moved instantaneously without noise between its different positions.

13 Claims, 6 Drawing Sheets

(58) Field of Classification Search
CPC ...... A47J 31/407; A47J 31/4492; A47J 31/52; C08L 2201/12
USPC .... 99/295, 275, 280, 286, 288, 290, 300, 30
See application file for complete search history.

(56) References Cited

U.S. PATENT DOCUMENTS

| | | | | |
|---|---|---|---|---|
| 7,252,033 | B1* | 8/2007 | Lin | A47J 31/42 241/186.3 |
| 9,010,239 | B2* | 4/2015 | Haas | A21C 15/02 99/450.4 |
| 9,267,617 | B2* | 2/2016 | Stadelbauer | F16K 31/002 |
| 2003/0056655 | A1* | 3/2003 | Kollep | A47J 31/369 99/295 |
| 2003/0168438 | A1* | 9/2003 | Zhou | A47J 37/0835 219/386 |
| 2009/0183640 | A1* | 7/2009 | Ozanne | A47J 31/3695 99/295 |
| 2010/0112152 | A1* | 5/2010 | Sinnema | A47J 31/404 426/248 |
| 2010/0300300 | A1* | 12/2010 | Denisart | F16K 11/027 99/302 R |
| 2014/0183220 | A1* | 7/2014 | Butera | A47J 31/46 222/54 |
| 2014/0322417 | A1* | 10/2014 | Kim | F24C 15/322 426/523 |
| 2015/0274078 | A1* | 10/2015 | Alacqua | B60R 1/087 250/201.1 |

FOREIGN PATENT DOCUMENTS

| | | |
|---|---|---|
| JP | 2006141990 | 6/2006 |
| WO | 2013076634 | 5/2013 |
| WO | 2014037299 | 3/2014 |

* cited by examiner

Fig.4
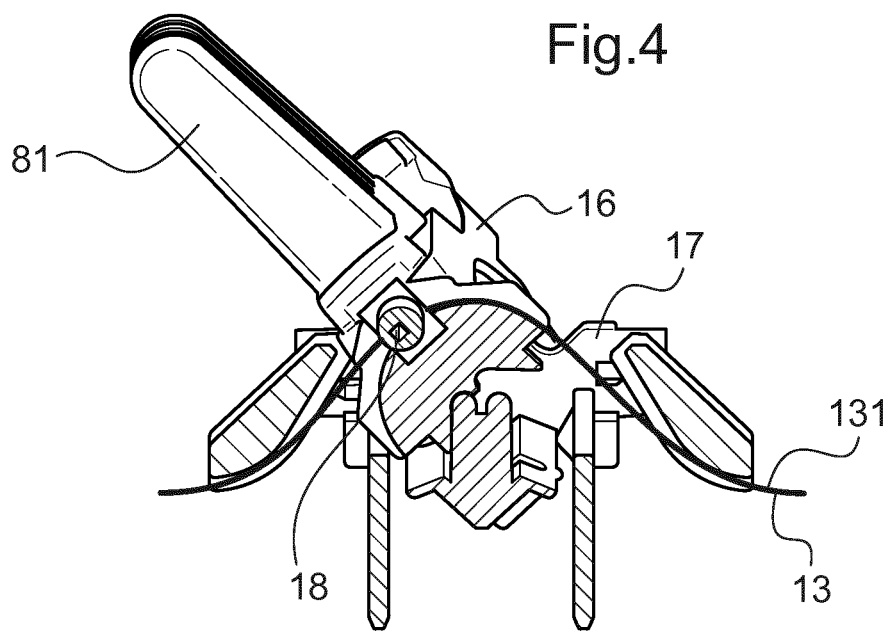
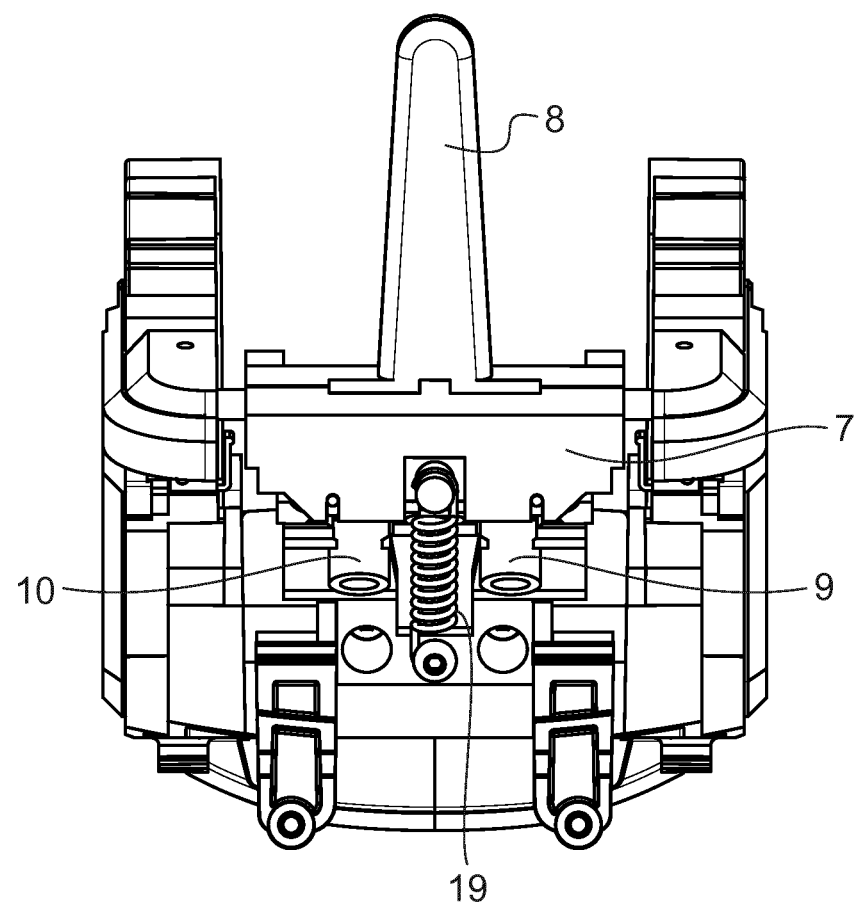
Fig.5

FOOD OR BEVERAGE PREPARATION MACHINE

CROSS REFERENCE TO RELATED APPLICATIONS

The present application is a National Stage of International Application No. PCT/EP2015/064110, filed on Jun. 23, 2015, which claims priority to European Patent Application No. 14173920.1, filed Jun. 25, 2014, the entire contents of which are being incorporated herein by reference.

FIELD OF THE INVENTION

The present invention concerns a food or beverage preparation machine, in particular a home appliance, comprising a mechanical part which is mobile between at least a first and a second position. An actuator is implemented to move the mobile mechanical part to or maintain the mobile mechanical part in a certain position.

BACKGROUND OF THE INVENTION

Beverage preparation machines are well known in the food science and consumer goods area. Such machines allow a consumer to prepare at home a given type of beverage, for instance a coffee-based beverage, e.g. an espresso or a cup of brew-like coffee.

Today, most beverage preparation machines for in-home beverage preparation comprise a system made of a machine which can accommodate portioned ingredients for the preparation of the beverage. Such portions can be soft pods or pads, or sachets, but increasingly systems use semi-rigid or rigid portions such as rigid pods or capsules. Below, it will be considered that the beverage machine of the invention is a beverage preparation machine working with a rigid or semi-rigid capsule.

The machine comprises a receptacle or cavity for accommodating said capsule and a fluid injection system for injecting a fluid, preferably water, under pressure into the capsule. Water injected under pressure into the capsule, for the preparation of a coffee beverage according to the present invention, is preferably hot, that is to say at a temperature above 70° C. However, in some particular instances, it might also be at ambient temperature, or even chilled. The pressure inside the capsule chamber during extraction and/or dissolution of the capsule contents is typically about 1 to about 8 bar for dissolution products and about 2 to about 12 bar for extraction of roast and ground coffee. Such a preparation process differs a lot from the so-called "brewing" process of beverage preparation—particularly for tea and coffee, in that brewing involves a long time of infusion of the ingredient by a fluid (e.g. hot water), whereas the beverage preparation process allows a consumer to prepare a beverage, for instance coffee, within a few seconds.

The principle of extracting and/or dissolving the contents of a closed capsule under pressure is known, and consists typically of inserting the capsule in a receptacle or cavity of a machine, injecting a quantity of pressurized water into the capsule, generally after piercing a face of the capsule with a piercing injection element such as a fluid injection needle mounted on the machine, so as to create a pressurized environment inside the capsule either to extract the substance or dissolve it, and then release the extracted substance or the dissolved substance through the capsule. Capsules allowing the application of this principle have already been described for example in applicant's European patents EP 1472156 B1, and EP 1784344 B1.

Machines allowing the application of this principle have already been described for example in patents CH 605 293 and EP 242 556. According to these documents, the machine comprises a receptacle or cavity for the capsule and a perforation and injection element made in the form of a hollow needle comprising in its distal region one or more liquid injection orifices. The needle has a dual function in that it opens the top portion of the capsule on the one hand, and in that it forms the water inlet channel into the capsule on the other hand.

The machine further comprises a fluid tank—in most cases this fluid is water—for storing the fluid that is used to dissolve and/or infuse and/or extract under pressure the ingredient(s) contained in the capsule. The machine comprises a heating element such as a boiler or a heat exchanger, which is able to warm up the water used therein to working temperatures (classically temperatures up to 80-90° C.). Finally, the machine comprises a pump element for passing the water from the tank to the capsule, optionally though the heating element. The way the water passes within the machine is e.g. selected via a selecting valve means, such as for instance a peristaltic valve of the type described in applicant's European patent application EP 2162653 A1.

When the beverage to be prepared is coffee, one convenient way to prepare the coffee is to provide the consumer with a capsule containing roast and ground coffee powder, which is to be extracted with hot water injected therein.

In many instances, the machine comprises a capsule holder for holding a capsule, which is intended to be inserted in and removed from a corresponding cavity or receptacle of the machine. When a capsule holder is loaded with a capsule and inserted within the machine in a functional manner, the water injection means of the machine can fluidly connect to the capsule to inject water therein for food or beverage preparation, as described above. A capsule holder was described for example in applicant's European patent EP 1967100 B1.

In many instances, the machine comprises mobile mechanical parts, such as actuating means (e.g. a control lever or button) which have to be actuated by the user during preparation of a beverage or food product. For example, some machines make it possible to prepare hot or cold beverage and therefore require the use of a two or three-way valve which makes possible the selection of the fluid line from a plurality of positions, typically "hot", "cold" and "closed".

The selection of the position of the fluidic valve, and thus of the fluid line is performed either manually by the user thanks to a selection lever, for example a rocking lever which may be positioned for example in three positions corresponding to said three typical positions of the fluid network, or automatically by pressing a button which may be on a control panel of the machine and which activates a motor to switch the valve automatically between positions of the fluid network. Such a system is described for instance in Applicant's European patent EP 2162653 B1.

Although these systems work well and are easy to use, they may be improved. Indeed, manual systems require a manual intervention of the user for the fluid network position selection (eg. "hot" or "cold" fluid delivery position), and also for closing the valve when the desired amount of product has been delivered. This requires the user to stay near the machine during the preparation of the product which takes a few seconds, and to stay vigilant in order to close the valve and thus stop the machine at the right time.

Automatic systems to improve consumer experience and solve the drawbacks of the manual machines, have been developed which use a motorized valve, wherein the valve is actuated by an electric motor. These automatic systems work well and allow the user to walk away from the machine once the preparation of the beverage has started, i.e. once the opening of the valve has been commanded. Indeed the valve is automatically closed when a selected or predefined beverage volume has been delivered. However, motors used in such automated machines are rather noisy, and they do not allow a quick and instantaneous displacement of the valve between its different positions which sometimes results in a lack of precision of the volume dispensed and also sometimes some—limited—leakage issues.

The same drawbacks may more or less exist for every mobile part (which is either manually or automatically moved) of a food or beverage preparation machine, and in particular a home appliance. Said mobile parts may include valves, actuating means such as levers, closing and clamping means for a capsule receptacle, and so on.

It is therefore an objective of the present invention to provide a home appliance for food or beverage preparation that solves or reduces at least one of the above mentioned drawbacks.

SUMMARY OF THE INVENTION

The objective set out above is met with a food or beverage preparation machine (intended for home use) comprising a mechanical part which is mobile between at least a first and a second position, wherein it comprises an actuator comprising a wire made of a shape memory material, said wire having a retracted state and an extended state, said actuator being configured to move the mechanical part to or maintain the mechanical part in one of said first and second positions by retraction of the wire.

The invention solves the disadvantages of the current systems used to move a mobile part such as a fluid valve, to select a valve position or to maintain said valve in a certain position after having been manually set in said certain position, using an actuator technology which uses a wire made of a shape memory material, typically shape memory alloy ("SMA"). The change from the extended state to the retracted state of the wire may be controlled by an electronic system, and is silent. In addition, an actuator using an SMA wire provides advantages in terms of accuracy and speed: the mobile part may be moved quickly and accurately in that the dimensional variations are precise, repeatable over time. If the mobile part is part of a fluid line or circuit, such as a fluid valve, a part for closing the head of the machine, or a part for clamping an ingredient package during preparation of the food product or beverage, using an actuator comprising an SMA wire enhances the tightness of the system, and thus reduces possible fluid leaks.

In one embodiment of the invention, in a beverage preparation machine, the delivery of the beverage can be controlled by actuation of a valve, coupled with the operation of a pump. This actuation of the valve may be performed manually (by moving actuating means such as a lever into a particular position) or through retraction of the wire. When the desired predefined quantity of beverage has been delivered, a valve or a valve actuation means returns to its initial position thanks to a controlled extension of the wire (e.g. by controlling the end of its retraction). Another embodiment relates to closing of the head of a beverage preparation machine in which an ingredient capsule is used, and more particularly to moving a mobile plate for clamping the capsule during beverage preparation.

In an embodiment of the invention, the machine is configured so that, when the wire is in the extended state, the mechanical part is in the first position, and when the wire is brought to the retracted state it pulls the mechanical part into the second position.

The machine may further comprise a spring which biases the mechanical part return towards the first position.

According to a first embodiment of the invention, the mechanical part comprises a fluid valve assembly. In such an embodiment, the mechanical part may be mobile between at least a first, a second, and a third position, and the actuator comprises a first and a second segment of wire made of a shape memory material, said actuator being configured to move or maintain the mechanical part in the second position upon retraction of the first segment of the wire and in the third position upon retraction of the second segment of wire. More particularly, the machine may comprise a fluid outlet line, a first line for a first fluid, a second line for a second fluid, the valve being part of a valve assembly configured to select by which of the first and second lines the outlet line is supplied with fluid. In this first embodiment, the mechanical part may comprise an actuating means fixed to a rocker body, the machine comprising a base on which the rocker body is mounted in order to rock between at least one neutral position corresponding to the first position, and two selective closed-off/open positions of the first and second line, said selective closed-off/open positions corresponding to the second and third position and comprising a closed-off position of the second line and an open position of the first line, and an open position of the second line and a closed-off position of the first line. The valve may be a bi-stable or tri-stable valve. That is to say, the valve may have two or three stable positions, corresponding to the above-described first, second and third positions. Retraction of the first or second segment of the wire makes it possible to move the mobile part (e.g. a valve or a command lever) from any of these positions to another stable position.

The first line may comprise:
  a heater module, configured to heat the first fluid flowing through the first line to a temperature above 70° C.; and/or
  a single fluid tank to feed the first line and the second line with fluid; and/or
  a single pump to feed the first line and the second line with fluid.

According to a second embodiment of the invention, the machine comprises ingredient reception means with at least two parts movable relative to one another so as to open and close said ingredient reception means, and the mechanical part comprises at least one of said movable parts.

Preferably in this case, at least one of the parts of the ingredient reception means is a cavity for receiving an ingredient package, and the other part is a movable plate for clamping said ingredient package within said cavity, said mobile plate being configured to move around a rotation axis, the wire being attached to said mobile plate at an offset from said rotation axis.

In any one of the embodiments of the invention, a change from the extended to the retracted state (of the wire) and vice versa is caused by a change of temperature of the wire.

Advantageously, the wire may be attached to the mechanical part by pinching it between a washer and a surface of the mechanical part, or between the head of a rivet and a surface of the mechanical part.

The wire may follow through most of its length a rigid channel provided in the machine. In this case, the channel may comprise at least one curve, and all the curves of said channel have an inner radius of one centimetre or more. The channel may advantageously be formed at least over a portion of its length by two shells, and, at the interface between the two shells, one of the two shells comprises teeth and the other comprises grooves in which said teeth are engaged.

BRIEF DESCRIPTION OF THE DRAWINGS

Additional features and advantages of the present invention are described in, and will be apparent from, the description of the presently preferred embodiments which are set out below with reference to the drawings in which:

FIG. 4 is a schematic view in three dimension of a selection lever and valve assembly used in a particular embodiment of the invention;

FIG. 5 is a schematic view in three dimensions of a part of the head of FIG. 2, showing a selection lever and a valve assembly;

DETAILED DESCRIPTION OF THE INVENTION

Figure 1:
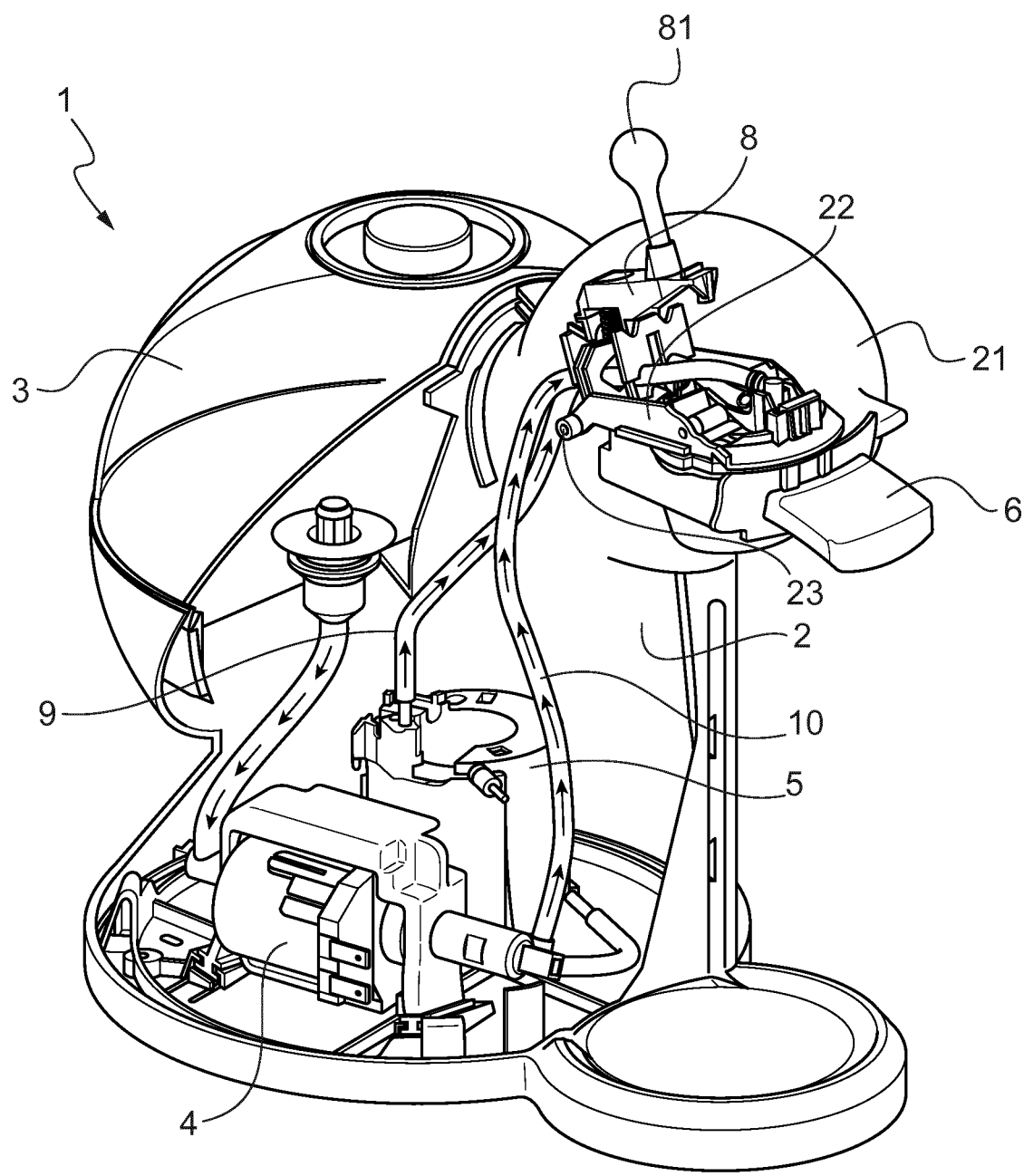
FIG. 1 is a general view of a beverage production machine.

As shown in FIG. 1, the machine 1 comprises a machine body 2 comprising a head 21, and a water reservoir 3. The machine body 2 encloses several items of technical equipment of the machine 1, including a pump 4 and a thermoblock 5. The thermoblock 5 may be a heater, a cooler, or both. The head 21 of the machine 1 encloses the equipment needed for beverage delivery: ingredient reception means 6, a valve assembly 7, and valve actuation means 8, which may comprise a lever 81. The ingredient reception means may be designed to receive a capsule, a sachet, or any other suitable package containing said ingredient. After such a package has been placed in the ingredient reception means, said reception means is closed to clamp the package. This is typically done by moving a mobile plate 22 of the head 21 around a rotation axis 23.

The machine shown in FIG. 1 comprises two fluid lines to feed the beverage delivery equipment. A first line 9 is configured to feed the delivery equipment with hot fluid such as hot water (e.g. above 70° C.). This first line 9 extends from the output of the pump 4 to the valve 7 and flows through the thermoblock 5. A second line 10 is configured to feed the delivery equipment with cold fluid such as cold water (e.g. at ambient temperature, or chilled).

The pump 4 may thus be used to supply fluid to both the first and second lines 9, 10. The pump 4 may be configured to provide the delivery equipment with pressurized water. The pressure in the delivery equipment may for example reach up to 1 to 12 bar. Several types of pump are suitable: piston pumps, diaphragm pumps, peristaltic pumps, etc.

The valve assembly 7, in the represented machine, makes it possible to choose which one of the first and second lines 9, 10 is used to feed the beverage delivery equipment. In the represented example, the valve assembly 7 comprises two valves, connected to each other such that when a first valve is in an open state, the other is in a closed state. The valve assembly 7 also has a position in which both valves are in a closed state. In another embodiment (not represented), a three-way valve may be used. The part of the fluid network between the valve and the outlet of the machine 1 forms an outlet line 12.

In the represented embodiment, the lever 81 may be manually actuated to select one of the three positions of the valve assembly 7.

Figure 2:
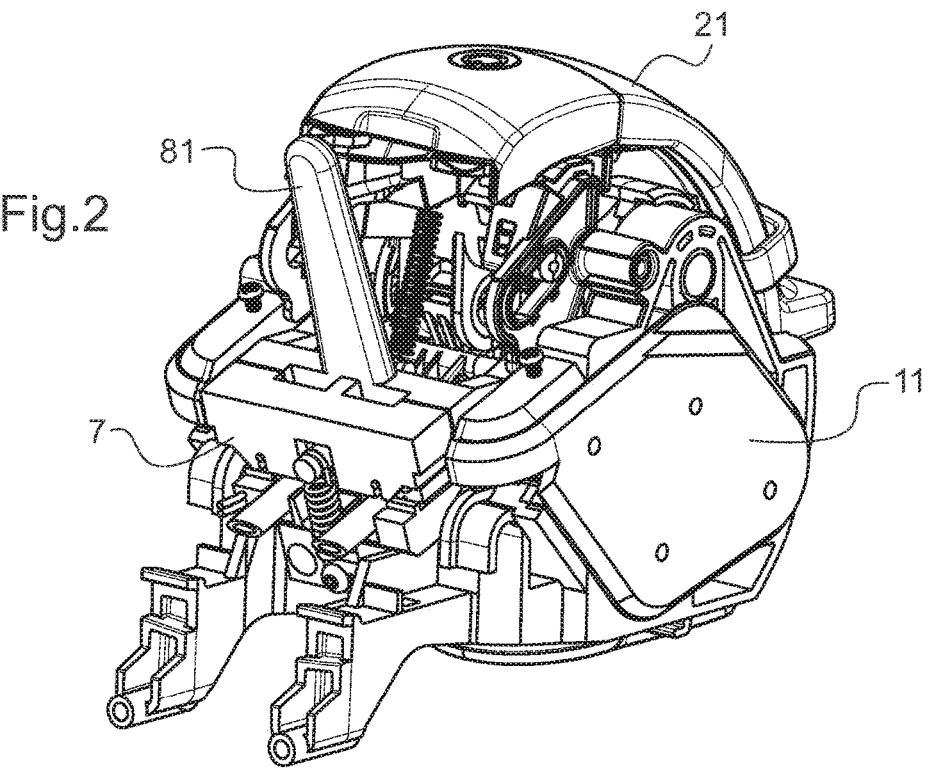
FIG. 2 is a schematic view in three dimensions of a head of a beverage production machine according to a first embodiment of the invention, the head comprising means for selection between two fluid lines.

FIG. 2 is a schematic view in three dimensions of a head of a beverage production machine according to an embodiment of the invention, the head comprising means to select one of the two fluid lines. The valve assembly 7 comprises a peristaltic valve, which closes one, the other, or both the first and second lines 9, 10, by compressing a flexible conduit of the line(s) to be closed. The valve is actuated by sliding to a left, right, or central position. In the illustrated embodiment of the invention, the machine comprises an actuator which may act on the valve assembly 7 or on actuating means 8 of said valve assembly 7. The actuator is configured to be able to move or maintain in a position the mobile part to which it is linked. The actuator comprises a wire 13 (as represented in FIG. 4) made of a shape memory material. The wire 13 may take on an extended state and a retracted state. Generally, the retracted state is obtained by heating the wire. Heating is preferably obtained by Joule effect by passing an electric current through the wire. However, in other embodiments, a heat source (independent from the wire 13) may be provided to heat the wire directly.

In the represented embodiment of the invention, the wire 13 is installed under a side cover 11.

Figure 3:
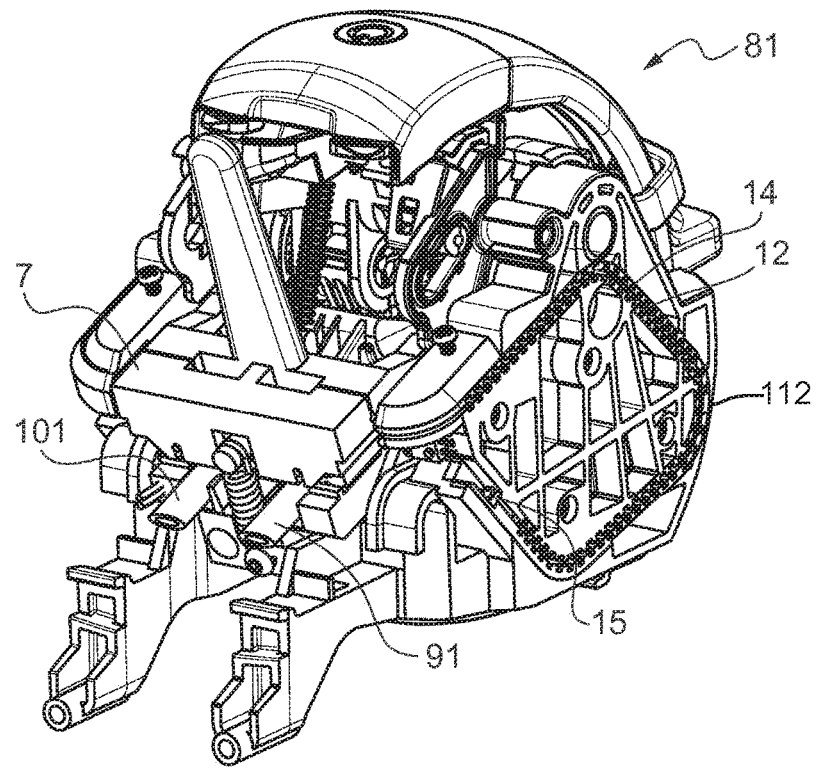
FIG. 3 is a schematic view in three dimensions of a part of the head of FIG. 2, showing details of the implementation of a shape memory wire in an embodiment of the invention.

FIG. 3 is a schematic view in three dimensions of a part of the head of FIG. 2, showing details of the implementation of a shape memory wire in an embodiment of the invention. In FIG. 3, the lever 81 and the side cover 11 are not represented. On the side of the head 21, a channel 12 is formed to receive the wire 13.

On both sides of the channel 12, grooves 14 are formed. The side cover 11 has corresponding teeth that fit the grooves 14 when the cover is assembled on the head 21. This hinders slipping of the wire between the head 21 and the side cover 11. The grooves may be formed in the head 21 or by the conjunction of the head and the side cover 11.

At one end of the channel, situated on a lateral face (side) of the head 21, there is provided a stopper 15 preferably made of plastic material, to which a first end of the wire 13 is attached. The wire 13 is advantageously crimped to said stopper, which is fixed in a corresponding housing of the head 21. In another embodiment, a spring may be used instead of the stopper 15.

In the shown embodiment of the invention, the other end of the channel is situated next to the valve assembly 7, on another face of the head 21. Thus, the channel 12 is organized in two, substantially perpendicular, planes.

The wire 13 must slide freely in the channel 12, to allow its retraction and elongation. To ensure this, the channel 12 has one or more optional curves 112 of the channel 12, none of the one or more optional curves 112 having a radius less than one centimetre. Preferably, the channel 12 is formed of straight portions and the one or more optional curves 112, all the one or more optional curves 112 each having an inner radius of one centimetre or more.

FIG. 4 is a schematic view in three dimension of a selection lever and valve assembly used in an embodiment of the invention. The lever 81 is fixed to a rocker body 16. The rocker body 16 is mounted on a base 17. The rocker body 16 may rock to at least three position: a first position corresponding to the closure of the first and second lines 9, 10, and two selective closed-off/open positions of the first and second lines 9, 10, namely a second position in which the first line is in an open state and the second line is in a closed state, and a third position in in which the first line is in an closed state and the second line is in an open state.

In the represented embodiment of the invention, the wire 13 which is made of shape memory material is attached to the rocker body 16 at a point of attachment 18 at an offset from a rotation axis of said rocker body 16. The wire 13 is preferably attached by pinching against a surface of the rocker body 16. More particularly, the wire may be pinched between a washer or the head of a rivet and a surface of the rocker body. When the wire 13 is retracted on one side of the lever, it pulls on the rocker body. The distance between the axis of rotation and the point where the wire is attached transforms the force generated by retraction of the wire into a torque which tends to place or maintain the lever in a given position (namely the second or third position).

In the represented example, the wire 13 made of shape memory material is directly attached to a mobile part of the head 21: lever 81, rocker body 16, or valve assembly 7. In other embodiments, the actuator comprising the wire 13 may comprise a cable made of a material having no particular shape memory property, said cable being attached to the mobile part and the wire having shape memory properties being attached to the cable.

In the represented embodiment, the actuator comprises two segments of wire. The first segment 131 of the wire 13 is situated on one side of the point of attachment 18 of the wire 13 to a mobile part (e.g. the rocker body 16), while the second segment 132 of the wire 13 is situated on the other side. Retraction of the first segment 131 of wire tends to place or maintain the lever in the second position (the lever being pulled to the right according to the point of view of FIG. 4), while retraction of the second segment 132 of wire tends to place or maintain the lever in the third position (the lever being pulled to the left). Of course, when either the first or second segment of wire is retracted, the other one must be in extended state or must simultaneously return to the extended state. The length of the second segment 132 of wire in its extended state must be sufficient not to impair the movement of the mobile part to the second position. Similarly, the length of the first segment 132 of wire in its extended state must be sufficient not to impair the movement of the mobile part to the third position.

Typical shape memory wires commercially available are made of shape memory alloy. They may have an around 4% pre-trained memory (which means that the wire is 4% shorter in retracted state than in extended state). The wires have several technical characteristics, for example a maximum longitudinal force they can hold for a given number of cycles. This could be used to determine where the point of attachment has to be located not to exceed this force when the wire is retracted. The length of the wire to be used may be determined based on determined geometrical characteristics of the system. It is preferable not to use the full potential of retraction of the wire, because part of the "memory" of the material may be lost after some hours of use. For example, the system may be designed to use 3.8% of retraction of a wire having a full potential of 4.1% of retraction.

For the actuation of the lever 81 in the represented embodiment of the invention, the wire may for example have a length comprised between 250 mm and 320 mm in its extended state. The wire may typically have a thickness (i.e. diameter if the wire has a round or substantially round section) comprised between 0.25 mm and 0.35 mm, and preferably of 0.31 mm.

FIG. 5 is a schematic view in three dimensions of a part of the head 21 of the embodiment of the invention shown in FIGS. 2 to 7. This view shows more particularly the selection lever 81 and the valve assembly 7. As previously explained, the valve assembly may take three positions, corresponding to three given positions of the lever 81. In the first position represented in FIG. 5, the lever is in the "middle" position. A return spring 19 tends to place the valve assembly 7 and the lever in said first position. For example, the spring can be a tension spring or a torsion spring. The spring may be attached at a point of the valve assembly 7, so that movement of the valve about the middle position causes tensioning of the spring. In the embodiment represented in FIG. 5, the spring is a tension spring. One end of the spring is connected fixedly to the head 21, and the other end is fixed to the valve. Any movement of the valve assembly, e.g. caused by retraction of the wire 13 or a segment of the wire 13 causes a tensioning of the spring. As the tensioned spring tends to return to its initial state, it tends to return the valve to its initial state, ie to the middle or first position.

In a particular embodiment of the invention, the wire 13 or a segment of the wire must be kept in its retracted state to maintain the valve in position. In another particular embodiment, the valve may be a bistable or tristable valve. In such an embodiment, the valve has two or three stable positions. These stable positions in which the valve is latched correspond to the above-described first, second and third positions. Retraction of the first or second segment of wire makes possible to move the valve from any of these positions to another stable position. After the valve has been set in a desired position (e.g. first, second, or third position), the wire 13 (or the first and second wire segments 131, 132) may be returned to the extended state, and no force is imparted to said wire 13.

Figure 6:
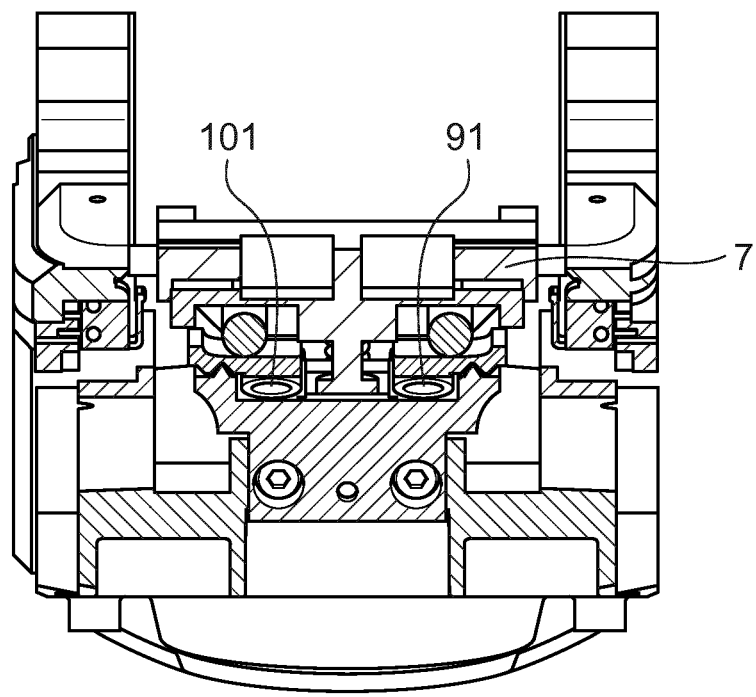
FIG. 6 is a schematic sectional view of part of the head of FIG. 2, from to the same point of view as FIG. 5, showing a valve in a first position.

FIG. 6 is a schematic sectional view of the system represented in FIG. 5, from the same point of view. As shown on this Figure, when the valve or valve assembly is in the first position, a first elastic tube 91 of the first line 9 and a second elastic tube 101 of the second line 10 are both pressed and flattened, so that the first line and the second line are both in a closed-off state (the elliptical section of the tubes shown in FIG. 6 for a better understanding of the drawings must not be interpreted as a partial opening of the lines: the tubes are pressed so that they does not allow a fluid to flow through the valve).

Figure 7:
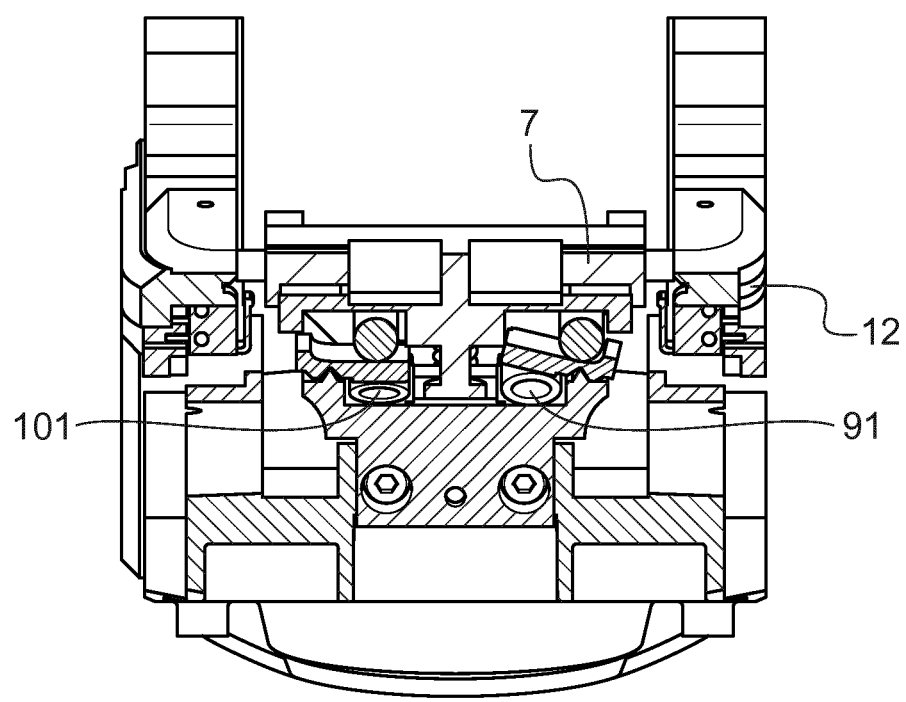
FIG. 7 represents the same sectional view as FIG. 6 and shows the valve in a second position.

FIG. 7 represents the same view as FIG. 6 and shows the valve in a second position. In the second position, the lever (not represented in FIG. 7) has been tilted to the right, making the valve assembly 7 slides to the right thanks to an appropriate mechanism. In this second position, the second tube 101 of the second line is in a closed-off state, while the first tube 91 of the first line is in an open state.

In the position of the valve assembly 7 represented in FIG. 7, the first segment 131 of wire (not represented) is in retracted state. The second segment 132 of wire is in extended state. According to various embodiments of the invention, the retraction of the first segment of wire 131 moves the valve assembly 7 from the first position represented in FIG. 6 to the second position represented in FIG. 7, or maintains the valve assembly 7 in the second position after it has been set manually in said second position (e.g. by manually tilting the lever 81).

Retraction of a wire made of shape memory material is generally obtained by heating said wire. In the represented example, heating of the first segment of wire 131 is controlled either to move the valve to the second position, or following the detection of the manual positioning of the lever (or valve assembly) in said second position. Heating of a wire made of shape memory alloy may be obtained by generating an electric current through the wire. This causes resistance heating (Joule effect heating).

Figure 8:
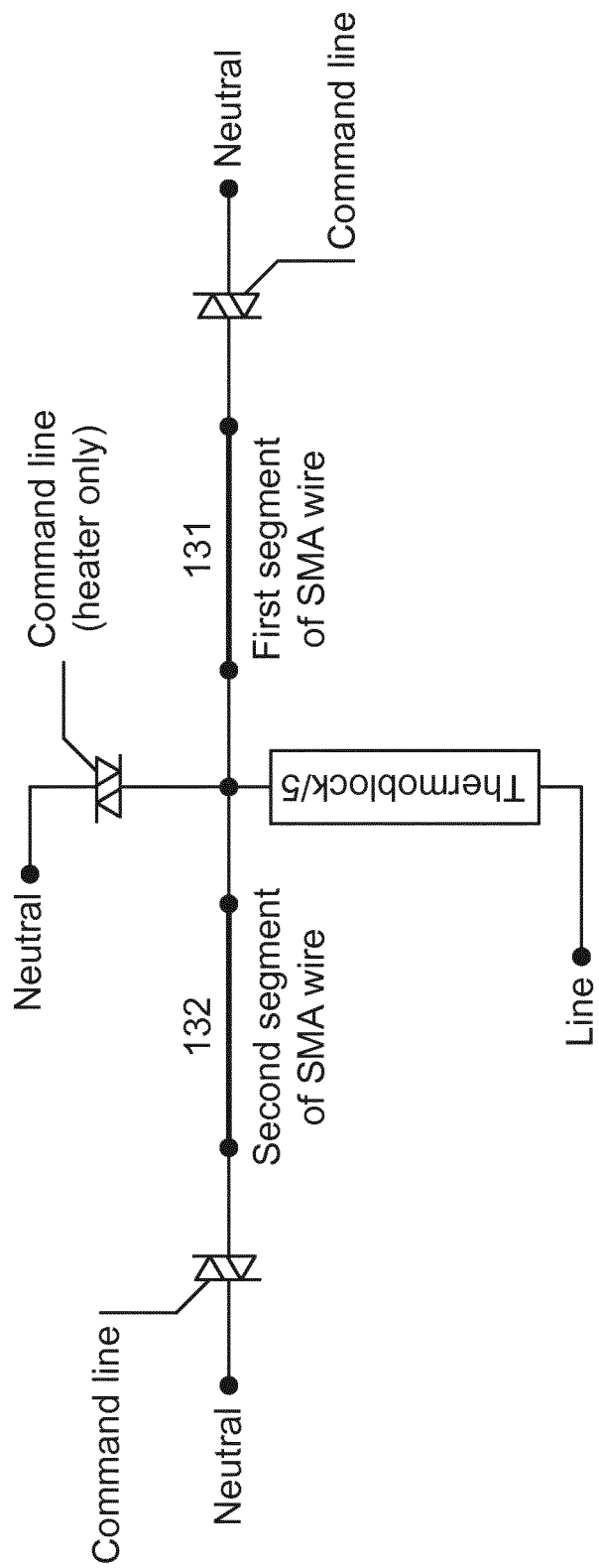
FIG. 8 is a schematic representation of the command of an actuator comprising two wire segments made of shape memory material, implemented in a particular embodiment of the invention.

FIG. 8 illustrates a possible electrical arrangement for controlling an actuator comprising two segments of wire made of shape memory material, which may be implemented in an embodiment of the invention.

This electrical arrangement allows independent heating of the first segment 131 of wire, of the second segment 132 of wire, and of the thermoblock 5. More particularly, a DIAC (Diode for Alternating Current) is associated with each segment of wire and with the thermoblock, to allow power supply to one or more of these three elements.

The previously described embodiment of the invention makes for example possible to use a beverage preparation machine 1 according to the following sequence:
  the user places an ingredient container, for example a capsule of coffee, in the beverage delivery equipment 6, and more particularly in a receptacle (e.g. a capsule receptacle) of said delivery equipment 6;
  the user manually closes the head 21 of the machine 1 on the ingredient container.
  the user manually places the lever 81 in the first position, corresponding to the desired liquid (typically hot water or cold water). This places the valve assembly 7 in the corresponding position.
  the machine determines that the lever has been placed in the second position. The first segment of wire is heated to maintain the lever and valve in position. The pump 4 and thermoblock 5 are activated.
  after the desired quantity of beverage has been delivered, the pump and thermoblock are automatically switched off. Heating of the first segment 131 of wire is simultaneously stopped. A return spring returns the lever to its initial position.

The same sequence may be performed for cold beverage, except that the lever is placed in the third position, the thermoblock is not activated, and it is the second segment of wire which is activated.

If a machine according to another embodiment of the invention is used, the lever (if it exists) or valve assembly may be automatically placed by retraction of the wire in the second or third position (if the third position exists in said machine).

According to embodiments of the invention:
  a signal of the activation of the pump may be used to control heating of the wire (or wire segment);
  a flow-meter may be used to stop the pump and stop the heating of the wire (the information from the flow-meter may be directly used, or the information that the pump has stopped may be used);
  the type or a precise reference of the ingredient container may be selected by the user, or automatically detected by the machine, to adapt the delivered quantity of fluid.

The above described first embodiment of the invention relates to a beverage preparation machine using an actuator comprising an SMA wire to move or maintain a valve or valve assembly. Other mobile mechanical parts of such a machine may be actuated by such an actuator in other embodiments of the invention.

Figure 10:
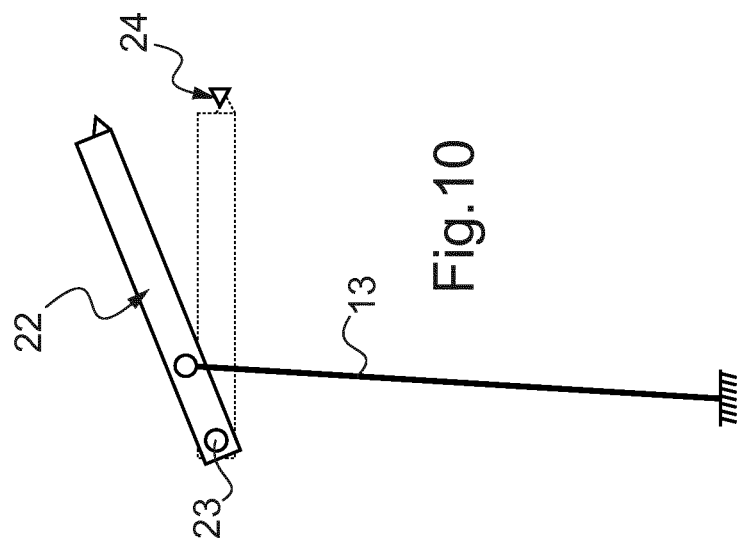
FIG. 10 is a schematic representation of an assembly for clamping an ingredient package used in the embodiment of FIG. 9.
Figure 9:
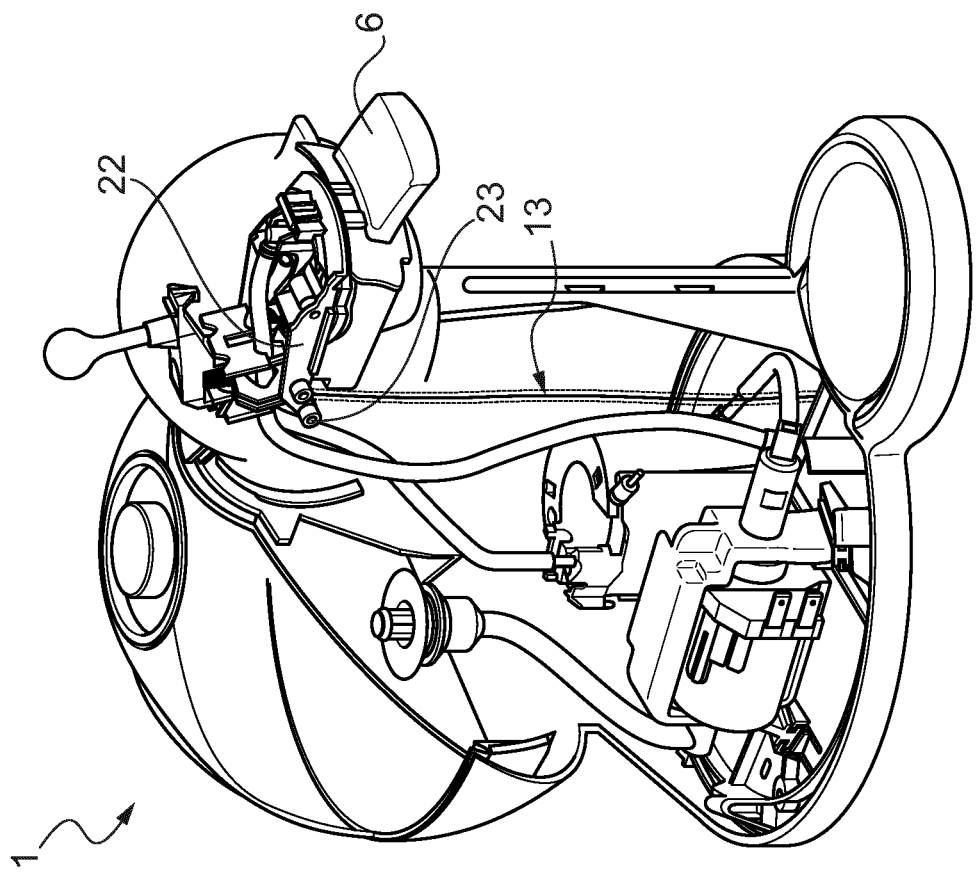
FIG. 9 is a schematic view of a beverage production machine according to a second embodiment of the invention, the head comprising means for clamping an ingredient package.

A second embodiment of the invention is shown in FIG. 9 and FIG. 10.

In this second embodiment, the machine comprises ingredient reception means 6 in which an ingredient package or container such as a capsule 24 (e.g. a capsule of coffee) may be placed. The ingredient reception means comprise two parts: one part defines an open cavity wherein said ingredient package is fitted, and the other part is a plate 22 that is mobile (or otherwise movable) so as to open and close said ingredient cavity part. In that functional state of the machine, the cavity is closed, and it is open for loading or disposing the ingredient package. In the represented embodiment of the invention, the mobile plate 22 is configured to move around a rotation axis 23. As explained above, the mobile plate 22 is mobile between two positions. In the first position (represented in solid lines in FIG. 10), the ingredient reception means 6 is open, making it possible to place or remove an ingredient package in said reception means 6. In the second position (represented in dotted lines in FIG. 10), the ingredient reception means 6 is closed, and the ingredient package is clamped between the mobile plate 22 and a fixed portion of the reception means 6. A spring (not visible) biases the mobile plate 22 return towards the first (open) position.

A wire 13 made of a shape memory material is attached to said plate at an offset from said rotation axis. Retraction of the wire 13 causes the plate 22 to move to the second (closed) position. A latch 24 maintains the plate in the second position after retraction of the wire 13. The wire may thus return to its extended state while the latch maintains the plate in the closed position. For instance, if the wire is retracted by heating, said heating may be stopped when the mobile 22 has reached the second position. If high pressure is established in the ingredient reception means during a food product or beverage preparation, the latch bears the pressure and no force caused by said pressure is imparted to the wire 13.

Many types of latches, manually or automatically actuated, may be used. In a preferred embodiment, the latch is closed by placing the plate in the closed position, and released by moving the plate once again in the same direction. Typically, the wire 13 may be retracted a first time to place the plate in the closed position and close the latch 24, returning to its extended state when the latch is closed and the food product or beverage is prepared, and subsequently retracted a second time to release the latch. A spring moves the plate 22 to its first (open) position. Such a latch system may use a peg which follows a first path when the plate is brought to its closed position, and a second path when said plate is pulled again (e.g. by retraction of the wire 13) and then released. Such a system may be similar to systems commonly used, for example, in retractable ballpoint pens.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A food or beverage preparation machine comprising a valve assembly, the valve assembly is mobile between a first position, a second position, and a third position,
the machine comprises a first fluid line and a second fluid line, wherein the first position closes both the first fluid line and the second fluid line, the second position closes the second fluid line with the first fluid line open, and the third position closes the first fluid line with the second fluid line open, the machine further comprises a wire made of a shape memory material, the wire having a retracted state and an extended state, the wire is configured to move the valve assembly to or maintain the valve assembly in one of the first, second, and third positions by retraction of the wire, the wire follows through most of a length of the wire a rigid channel provided in the machine,
the machine further comprises an ingredient receptor, the ingredient receptor having a cavity configured for receiving an ingredient package, the ingredient receptor further comprising a movable plate configured for clamping the ingredient package within the cavity, the cavity and the movable plate movable relative to each other to open and close the ingredient receptor, and a latch maintains the movable plate in the second position after retraction of the wire; and
wherein the wire is configured such that a change from the extended state to the retracted state and vice versa is caused by a change of temperature of the wire.

2. The machine according to claim 1, wherein the machine is configured so that when the wire is in the extended state the valve assembly is in the first position, and when the wire is brought to the retracted state the wire pulls the valve assembly into the second position.

3. The machine according to claim 1, comprising a spring which biases the valve assembly to return towards the first position.

4. The machine according claim 1, wherein the valve assembly comprises a fluid valve assembly.

5. The machine according to claim 1, wherein the wire comprises a first segment of wire and a second segment of wire both made of a shape memory material, the wire is configured to move or maintain the valve assembly in the second position upon retraction of the first segment of the wire and in the third position upon retraction of the second segment of wire.

6. The machine according to claim 1, the machine comprising a fluid outlet line, and the valve assembly is configured to select by which of the first and second lines the fluid outlet line is supplied with fluid.

7. The machine according to claim 1, wherein the valve assembly comprises a lever fixed to a rocker body, the machine comprising a base on which the rocker body is mounted in order to rock between at least one neutral position corresponding to the first position, and two selective closed-off/open positions of the first and second lines, the selective closed-off/open positions corresponding to the second and third positions and comprising a closed-off position of the second fluid line and an open position of the first fluid line, and an open position of the second fluid line and a closed-off position of the first fluid line.

8. The machine according to claim 1, wherein the first fluid line comprises an element selected from the group consisting of:
a heater module configured to heat the first fluid flowing through the first fluid line to a temperature above 70° C.;
a single fluid tank configured to feed the first fluid line and the second fluid line with fluid; and
a single pump configured to feed the first fluid line and the second fluid line with fluid.

9. The machine according to claim 1, wherein the movable plate is configured to move around a rotation axis, and the wire is attached to the movable plate at an offset from the rotation axis.

10. The machine according to claim 1, wherein the wire is attached to the valve assembly by pinching the wire between a washer and a surface of the valve assembly, or between a head of a rivet and a surface of the valve assembly.

11. The machine according to claim 1, wherein the rigid channel comprises at least one curve, wherein the at least one curve of the rigid channel has an inner radius of one centimetre or more.

12. The machine according to claim 1, wherein the machine comprises a machine body comprising a head enclosing the valve assembly, and the channel is formed at least over a portion of a length of the channel by the machine body and a side cover, and wherein an interface between the machine body and the side cover comprises grooves in which the side cover is engaged.

13. The machine according to claim 9, wherein the offset between the rotation axis and the point where the wire is attached to the movable plate is configured to transform force generated by retraction of the wire into a torque which biases the valve assembly toward at least one of the second position or the third position.

* * * * *